(12) United States Patent
Warren (10) Patent No.: US 8,486,317 B2
(45) Date of Patent: Jul. 16, 2013

(54) APPARATUS AND METHOD FOR FORMING LAMINATED AND MOLDED GARMENTS

(75) Inventor: Roger D. Warren, Claremont, NC (US)

(73) Assignee: HBI Branded Apparel Enterprises, LLC, Winston-Salem, NC (US)

( * ) Notice: Subject to any disclaimer, the term of this patent is extended or adjusted under 35 U.S.C. 154(b) by 1343 days.

(21) Appl. No.: 10/878,090

(22) Filed: Jun. 28, 2004

(65) Prior Publication Data

US 2005/0051923 A1 Mar. 10, 2005

Related U.S. Application Data

(60) Provisional application No. 60/483,681, filed on Jun. 30, 2003.

(51) Int. Cl.
*B29C 51/14* (2006.01)

(52) U.S. Cl.
USPC .......................................... 264/163; 264/155

(58) Field of Classification Search
USPC ................................................ 264/163, 155
See application file for complete search history.

(56) References Cited

U.S. PATENT DOCUMENTS

| | | | |
|---|---|---|---|
| 2,867,889 A | 1/1959 | Thompson | |
| 3,058,154 A | 10/1962 | Howard et al. | |
| 3,164,655 A | 1/1965 | Howard et al. | |
| 3,202,565 A | 8/1965 | Loftin | |
| 3,527,858 A | 9/1970 | Braxtn et al. | |
| 3,574,520 A | 4/1971 | Aldrich | |
| 3,799,174 A | 3/1974 | Howard | |
| 3,891,377 A | 6/1975 | Howard | |
| 3,956,447 A | 5/1976 | Denommee et al. | |
| 4,008,029 A * | 2/1977 | Shokite | 425/157 |
| 4,080,416 A | 3/1978 | Howard | |
| 4,172,002 A | 10/1979 | Gluckin | |
| 4,199,388 A | 4/1980 | Tracy et al. | |
| 4,202,853 A | 5/1980 | DiTullio | |
| 4,243,456 A * | 1/1981 | Cesano | 156/214 |
| 4,250,137 A | 2/1981 | Riedler | |
| 4,271,116 A | 6/1981 | Jones | |
| 4,328,067 A | 5/1982 | Cesano | |
| 4,372,321 A | 2/1983 | Robinson | |
| 4,375,445 A | 3/1983 | Cole | |

(Continued)

FOREIGN PATENT DOCUMENTS

JP 2001328099 11/2001

OTHER PUBLICATIONS

Canadian Intellectual Property Office, Official Action in corresponding Canadian Application No. 2,722,333, Apr. 2, 2012.

(Continued)

*Primary Examiner* — Galen Hauth
(74) *Attorney, Agent, or Firm* — Womble Carlyle Sandridge & Rice LLP (57) ABSTRACT

A method for forming a molded garment is provided. The method includes positioning an assembly of material between a first heated mold element and a second heated mold element, moving the first and second heated mold elements in relation to one another to laminate the assembly of material into a laminated assembly; moving a third heated mold element through the first heated mold element into contact with the laminated assembly so that the third heated mold element shapes a portion of the laminated assembly; and causing the first and second heated mold elements to trim fabric from the laminated to define the molded garment.

8 Claims, 5 Drawing Sheets

U.S. PATENT DOCUMENTS

| | | |
|---|---|---|
| 4,398,981 A | 8/1983 | Ellis |
| 4,474,840 A | 10/1984 | Adams |
| 4,481,951 A | 11/1984 | Cole et al. |
| 4,572,195 A | 2/1986 | Hyams |
| 4,581,187 A | 4/1986 | Sullivan et al. |
| 4,645,629 A | 2/1987 | Stern |
| 4,674,204 A | 6/1987 | Sullivan et al. |
| 5,114,651 A * | 5/1992 | Warburton .................... 264/156 |
| 5,154,659 A * | 10/1992 | Gluckin .......................... 450/39 |
| 5,240,538 A | 8/1993 | Hyams et al. |
| 5,732,858 A | 3/1998 | Plastino |
| 5,755,611 A | 5/1998 | Noble et al. |
| 2002/0106970 A1 * | 8/2002 | Falla ................................. 450/1 |
| 2004/0142634 A1 | 7/2004 | Luk |

OTHER PUBLICATIONS

US International Searching Authority, International Search Report for PCT/ US04/20808, dated Dec. 28, 2004.

US International Preliminary Examination Authority, International Preliminary Report on Patentability for PCT/US04/20808, dated May 6, 2005.

* cited by examiner

APPARATUS AND METHOD FOR FORMING LAMINATED AND MOLDED GARMENTS

This application claims the benefit of U.S. provisional application 60/483,681 filed on Jun. 30, 2003

BACKGROUND OF THE INVENTION

1. Field of the Invention

The present invention relates to an apparatus and method for forming garments. More particularly, the present invention relates to an apparatus and method for forming laminated and molded garments.

2. Description of the Related Art

Various methods and/or mechanisms for making garments have been developed and are known. For example, U.S. Pat. No. 3,058,154 is directed to an apparatus and method for making breast fronts without the use of any sewing or seams. However, notwithstanding that which is known, there remains a constant need for improved methods and/or devices for providing simple, efficient, and economical garment manufacturing.

BRIEF DESCRIPTION OF THE INVENTION

It is an object of the present invention to provide an apparatus and method for forming a laminated and molded garment.

It is another object of the present invention to provide an apparatus and method for simultaneously laminating and molding a garment simply, efficiently, and economically.

It is still another object of the present invention to provide an apparatus and method that employs at least one first element, at least one second element, and at least one third element that interact to facilitate the simultaneous laminating and molding of garments.

It is yet another object of the present invention to provide an apparatus and method for forming a garment that offers improved durability and longevity.

These and other objects and advantages of the present invention are achieved by a method for forming a molded garment. The method includes positioning an assembly of material between a first heated mold element and a second heated mold element, moving the first and second heated mold elements in relation to one another to laminate the assembly of material into a laminated assembly; moving a third heated mold element through the first heated mold element into contact with the laminated assembly so that the third heated mold element shapes a portion of the laminated assembly; and causing the first and second heated mold elements to trim fabric from the laminated to define the molded garment.

These and other objects and advantages of the present invention are achieved by a method including positioning an assembly of material between a first heated mold element and a second heated mold element; holding the assembly of material in a desired location on the second heated mold element; moving the first and second heated mold elements in relation to one another to laminate the assembly of material into a laminated assembly while the second heated mold element shapes a portion of the laminated assembly; and causing the first and second heated mold elements to trim fabric from the laminated to define the molded garment.

Still further objects and advantages of the present invention are achieved by an apparatus having three heatable mold portions. The first heatable mold portion has a pair of breast cup cavities defined therein. The second heatable mold portion has a pair of openings defined therein. The openings correspond in position to the cavities. The third heatable mold portion has a pair of breast cup molds defined thereon. The breast cup molds are reciprocatively positioned in the openings so that the breast cup molds are moveable into and out of the breast cup cavities.

BRIEF DESCRIPTION OF THE SEVERAL VIEWS OF THE DRAWINGS

Other and further objects, advantages and features of the present invention will be understood by reference to the following specification in conjunction with the accompanying drawings, in which like reference characters denote like elements of structure.

DETAILED DESCRIPTION OF THE INVENTION

Figure 1:
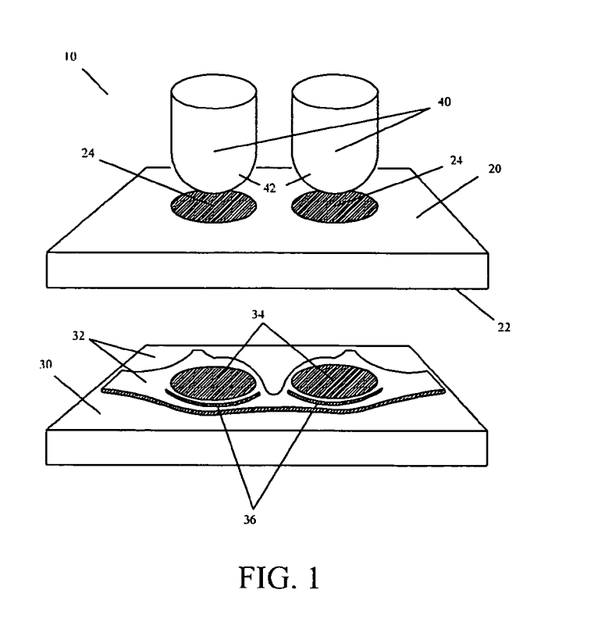
FIG. 1 is a front perspective view of an apparatus for forming a laminated and molded garment in accordance with an illustrative embodiment of the present invention.

Referring to the drawings and, in particular to FIG. 1, there is shown an illustrative embodiment of an apparatus for forming a laminated and molded garment, generally represented by reference numeral 10. The apparatus 10 essentially has at least one first element 20, at least one second element 30, and at least one third element 40 that cooperate to form the integral laminated and molded garment from an assembly of material 50 shown in FIG. 2.

Figure 2:
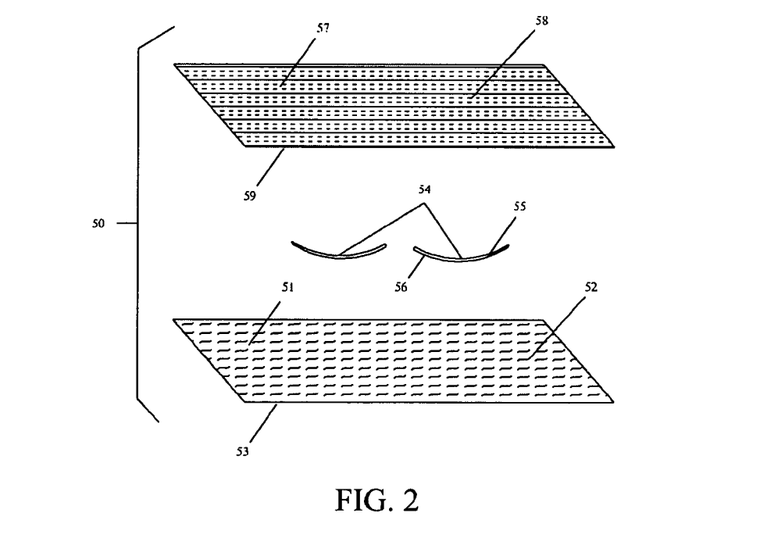
FIG. 2 is an exploded perspective view of an assembly of material in accordance with an illustrative embodiment of the present invention.
Figure 3:
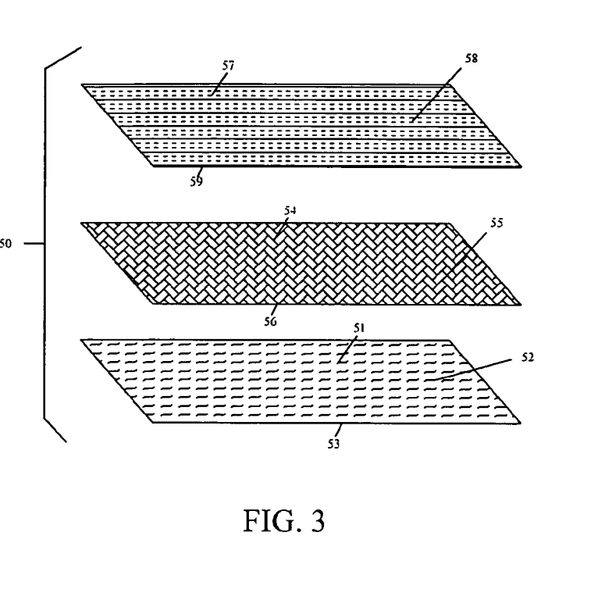
FIG. 3 is an exploded perspective view of an assembly of material in accordance with another illustrative embodiment of the present invention.
Figure 11:
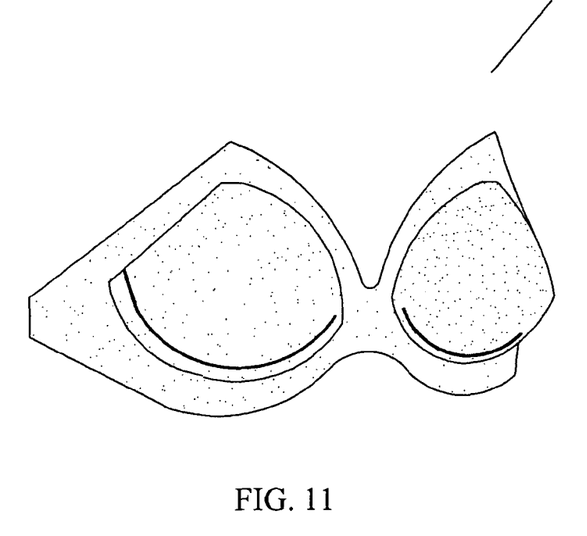
FIG. 11 is a perspective view of the integral laminated and molded garment of FIG. 10.

First element 20 is preferably a surface heated retention plate that cooperates with second element 30 and/or third element 40 to form a garment 70, such as that shown in FIGS. 1 and 11, from an assembly of material 50 such as that shown in FIGS. 2 and 3. First element 20 is preferably heated via any suitable method sufficient to accomplish the intended purposes thereof. For example, first element 20 can be heated via electric heating wires or rods (not shown), which transmit heat to a contacting surface 22 of the first element. First element 20 preferably has one or more through holes 24. Preferably one or more through holes 24 are sized, shaped and/or configured to accommodate third element 40 such that the third element can cooperate with first element 20 and second element 30, and can interact with the assembly of material 50 preferably during the garment forming process to provide a three dimensional shape to the assembly of material. Preferably, first element 20 can facilitate the controlled placement and/or lamination or bonding of material 50. First element 20 can move relative to second element 30 and/or third element 40. First element 20 can also be rigid and relatively stationary with respect to second element 30 and/or third element 40. Further, the contacting surface 22 of first element 20 can have any of a variety of textures, patterns and/or configurations sufficient to provide any of a variety of different effects on the assembly of material 50.

Second element 30 is preferably a surface heated support plate. As discussed above, second element 30 cooperates with first element 20 and/or third element 40 to form a garment 70, such as that shown in FIG. 11, from the assembly of material 50. Second element 30 is preferably heated via any suitable method sufficient to accomplish the intended purposes thereof. For example, second element 30 can be heated via electric heating wires or rods (not shown), which transmit heat to a contacting surface 32 the second element. Second element 30 preferably has one or more cavities or female mold sections 34. Preferably, one or more female mold sections 34 are sized, shaped and/or configured to accommodate third element(s) 40 such that third element(s) 40 can interact with material 50 preferably during the garment forming process to provide a three dimensional shape to the assembly of the material. Second element 30 can move relative to first element 20 and/or third element 40. Second element 30 can also be rigid and relatively stationary with respect to first element 20 and/or third element 40. The contacting surface 32 of second element 30 can have any of a variety of textures, patterns and/or configurations sufficient to provide any of a variety of different effects on the assembly of material 50. For example, contacting surface 32 of second element 30 can have a plurality of nodes, dimples or grooves 36, such as is shown in FIG. 1, for cooperating with a plurality of complementary nodes, dimples or grooves provided on first element 20 and/or third element 40.

Third element 40 is preferably one or more surface heatable male molds. As discussed above, third element 50 cooperates with first element 20 and/or second element 30 to form a garment 70 from the assembly of material 50. Third element 40 is preferably heated via any suitable method sufficient to accomplish the intended purposes of the third element. For example, the third element can be heated via electric heating wires or rods (not shown), which transmit heat to a contacting surface 42 thereof. Preferably, one or more male molds 40 are sized, shaped and/or configured to interact with first element 20 and to engage second element 30 such that the third element(s) can interact with material 50 preferably during the garment forming process to provide a three dimensional shape to the assembly of the material. Third element 40 can move relative to first element 20 and/or second element 30. Third element 40 can also be configured to be rigid and relatively stationary with respect to first element 20 and/or second element 30. It is noted that the contacting surface 42 of third element 40 can have any of a variety of textures, patterns and/or configurations sufficient to provide any of a variety of different effects on the assembly of material 50. For example, contacting surface 42 of third element 40 can have a plurality of nodes, dimples or grooves 36, such as is shown in FIG. 1, for cooperating with a plurality of complementary nodes, dimples or grooves provided on first element 20 and/or second element 30.

Referring to FIGS. 2 and 3, the assembly of material 50 preferably has at least an outer layer 52, an intermediate layer 54, and an inner layer 58. Preferably outer layer 52 is decorative and appealing to the eye, intermediate layer 54 is preferably a supportive type layer. Intermediate layer 54 preferably provides durability as appropriate for the type of garment being formed. Inner layer 58 is preferably soft to provide comfort during wear of the garment. Preferably, the various layers of material assembly 50 can be formed from natural and/or man-made fiber. Additional layers may also be incorporated as part of the assembly of material 50. For example, a separate adhesive or bonding layer can be used to facilitate fusing or bonding the various layers of the assembly together. The adhesive layer can have elastic properties sufficient to compliment those properties associated with the fibers or materials used in the various layers of the assembly of material 50. Adhesive layer may be suitable for use with a variety of fibers and fabric forming techniques, including microfibers and specialized nonwovens. Foam type materials may also be used or incorporated as part of material assembly 50. Preferably, apparatus 10 is suitable to accommodate the loft material characteristics of various types of foam such that the loft characteristics remain relatively unchanged after having been formed and/or molded in accordance with any of the illustrative embodiments of present invention.

Outer layer 52 preferably has an inner surface 51 and outer surface 53. Preferably, inner surface 51 has an adhesive or bonding substance integrated therein and/or dispersed thereon for facilitating the fusing or laminating of outer layer 52 with intermediate layer 54 and/or inner layer 58. Outer layer 52 can preferably be shaped, sized and/or configured to provide any of a variety of aesthetic impressions as appropriate or intended for a garment type. Intermediate layer 54 can preferably be secured or positioned only where essential for support.

Intermediate layer 54 is preferably at least somewhat less flexible than either outer layer 52 or inner layer 58. Like outer layer 52, intermediate layer 54 preferably has an inner surface 55 and an outer surface 56. Both inner and outer surfaces 55, 56, respectively, of intermediate layer 54 can have an adhesive or bonding substance integrated therein and/or dispersed thereon for facilitating the fusing or laminating of the intermediate layer with outer layer 52 and/or inner layer 58. Intermediate layer 54 can be shaped, sized and/or configured to comfortably conform against the body of a wearer of the garment to provide support and/or augmentation as appropriate or intended for a garment type. Intermediate layer 54 can preferably be secured or positioned only where essential for support. For example, intermediate layer 54 can be one or more stays or wires 54 positioned as shown in FIG. 2, which stays or wires 54 can preferably be made from any of a variety of different materials and/or combination of materials.

Inner layer 58 can preferably be formed from any material suitable for improving the comfort to the wearer. Also, preferably, inner layer 58 has an inner surface 57 and an outer surface 59. Preferably, outer surface 59 of inner layer 58 has an adhesive or bonding substance integrated therein and/or dispersed thereon for facilitating the fusing or laminating of outer layer 52 with intermediate layer 54 and/or outer layer 52. Preferably, inner layer 58 can be shaped, sized and/or configured to comfortably conform against the body of a wearer of the garment to provide comfort and/or reduce irritation as appropriate or intended for a particular garment type.

Inner layer 58 can, if desirable, be secured or positioned only where essential for providing comfort and/or reducing irritation.

Figure 4:
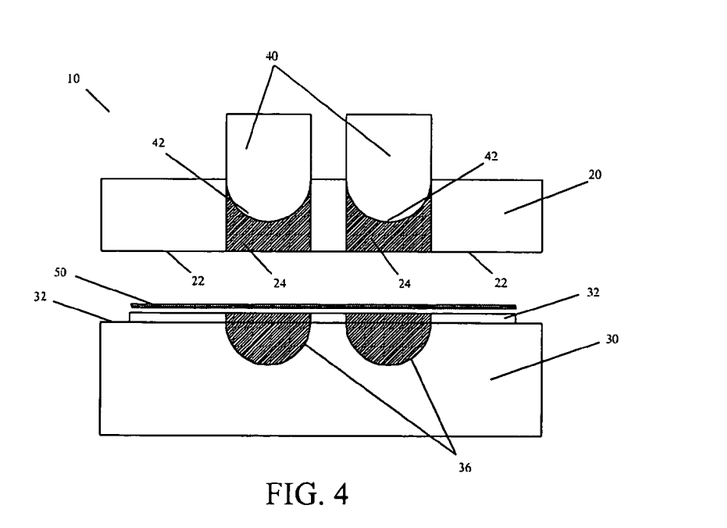
FIG. 4 is a side sectional view of the apparatus of FIG. 1, reflecting a forming step in accordance with an illustrative embodiment of the present invention.
Figure 5:
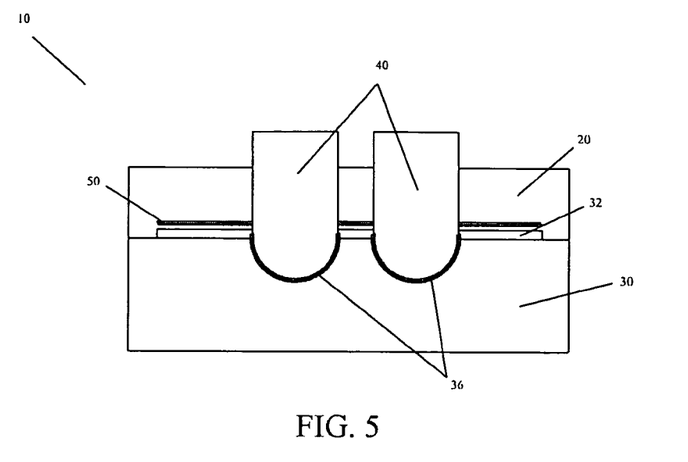
FIG. 5 is a side sectional view of the apparatus of FIG. 1, reflecting another forming step in accordance with an illustrative embodiment of the present invention.
Figure 6:
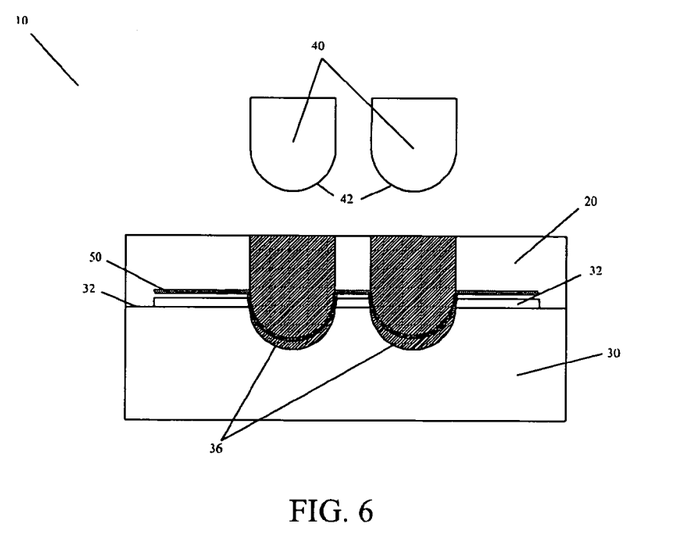
FIG. 6 is a side sectional view of the apparatus of FIG. 1, reflecting still another forming step in accordance with an illustrative embodiment of the present invention.
Figure 10:
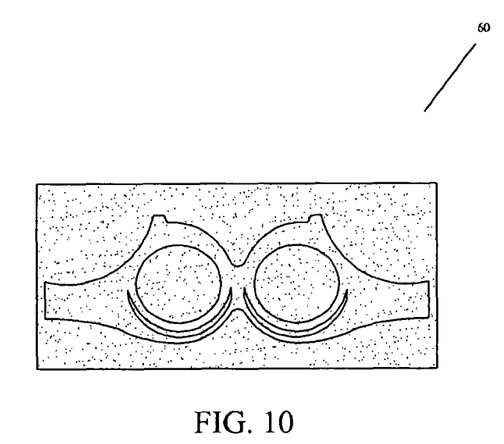
FIG. 10 is a plan view of a laminated and molded garment in accordance with an illustrative embodiment of the present invention.

Having described some of the preferred characteristics of the illustrative embodiment, the process or method for forming a garment 70, preferably includes at least the following steps. Referring to FIG. 4, an assembly of material 50 is first positioned in a heat molding apparatus having at least one first element 20, at least one second element 30, and at least one third element 40. Then, as shown in FIG. 5, first element 20 is moved into a closed relation with second element 30, or vice-versa, sandwiching the assembly of material 50 therebetween. Thereafter, third element 40 is engaged to cooperate with first element 20 and second element 30 such that the third element interacts with the assembly of material 50. Now, referring to FIG. 6, third element 40 is disengaged, then, first element 20 is opened in relation to second element 30, or vice-versa, to provide the integral laminated and molded assembly of material 50, such as that shown in FIG. 10. Thereafter, as shown in FIG. 11, any excess material is eliminated as appropriate, leaving the integral laminated and molded garment. For example, first and second elements 20, 30 can trim excess material during the molding process such that when the elements are opened, garment 70 is completed.

It is noted that the step of engaging third element 40 can be accomplished simultaneously with the step of closing first element 20 in relation to second element 30. Further, the step of disengaging third element 40 is preferably performed after a period of about 10 seconds to about 60 seconds and more preferably about 35 seconds, from the time third element 40 is engaged. Still further, the step of opening first element 20 in relation to second element 30 is preferably performed after an additional period of about 5 seconds to about 30 seconds and more preferably about 15 seconds from the time that third element 40 is disengaged.

Figure 7:
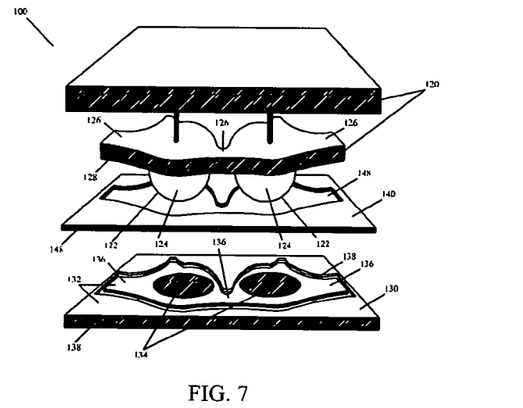
FIG. 7 is a front perspective view of an apparatus for forming a laminated and molded garment in accordance with another illustrative embodiment of the present invention.

Referring to FIG. 7, there is shown another illustrative embodiment of an apparatus for forming a laminated and molded garment, generally represented by reference numeral 100. Apparatus 100 preferably has at least one first element 120, a second element 130, and alternatively a third element 140, all of which cooperate to form the integral laminated and molded garment from an assembly of material 50.

First element 120 preferably has a surface heated retention plate 120 that can cooperate with second element 130 and/or third element 140 to form a garment 70, such as that shown in FIG. 11, from an assembly of material 50 such as that shown in FIGS. 2 and 3. First element 120 is preferably heated via any suitable method sufficient to accomplish the intended purposes thereof. For example, first element 120 can be heated via electric heating wires or rods (not shown), which transmit heat to a contacting surface 122 thereof.

First element 120 preferably has one or more male molds 124 and one or more elongated relatively planar portions 126 about the one or more male molds. Preferably one or more male molds 124 and one or more planar portions 126 are sized, shaped and/or configured to cooperate with one or more complementary female molds 134 and one or more planar portions 136 of second element 130.

Preferably, third element 140 can cooperate with first element 120 and second element 130 such that third element 140 can interact with the assembly of material 50 preferably during the garment forming process to retain or secure the assembly of material 50 during the garment forming process and/or to provide a texture, pattern or other type of shape or configuration to the assembly of material 50.

First element 120 can move relative to second element 130 and/or third element 140. First element 120 can be rigid and relatively stationary with respect to second element 130 and/or third element 140. Further, the contacting surface 122 of first element 120 can have any of a variety of textures, patterns and/or configurations sufficient to provide any of a variety of different effects on the assembly of material 50.

Second element 130 is preferably a surface heated support plate 130 fashioned to cooperate with first element 120 and/or third element 140. Second element 130 is preferably heated via any suitable method sufficient to accomplish the intended purposes thereof. For example, second element 130 can be heated via electric heating wires or rods (not shown), which transmit heat to a contacting surface 132 thereof. Preferably, one or more female molds 134 and one or more planar portions 136 of second element 130 are sized, shaped and/or configured to accommodate the one or more male molds 124 and one or more planar portions 126 of first element 120. Accordingly, first element 120 can interact with the assembly of material 50 during the garment forming process to provide a three dimensional shape to the assembly of material 50. Second element 130 can be rigid and/or move relative to first element 120 and/or third element 140. Contacting surface 132 of second element 130 can have any of a variety of textures, patterns and/or configurations sufficient to provide any of a variety of different effects on the assembly of material 50. For example, contacting surface 132 of second element 130 can have one or more holes, nodes, dimples or grooves 138 for cooperating with one or more complementary holes, nodes, dimples or grooves 128, 148 provided on first element 120 and/or third element 140, respectively.

Third element 140 is preferably a retention plate that can cooperate with first element 120 and/or second element 130 to form integral garment 70. Third element 140 can be heated, for example, by electric heating wires or rods (not shown), which transmit heat to a contacting surface 142 thereof. Third element 140 is preferably positioned between first element 120 and second element 130. Third element 140 can be sized, shaped and/or configured to facilitate or enable first element 120 to directly interact with second element 130 and/or the assembly of material 50 during the garment forming process. Preferably, third element 140 facilitates the controlled placement and/or lamination or bonding of the various layers of material assembly 50. Third element 140 can be rigid and/or move relative to first element 120 and/or second element 130. Contacting surface 142 of third element 140 can, as with the first and second elements 120, 130, have any of a variety of textures, patterns and/or configurations sufficient to provide any of a variety of different effects on the assembly of material 50. For example, contacting surface 142 can have one or more holes, nodes, dimples or grooves 148 for cooperating with one or more complementary holes, nodes, dimples or grooves 128, 138 provided on first element 120 and/or second element 130, respectively.

Figure 8:
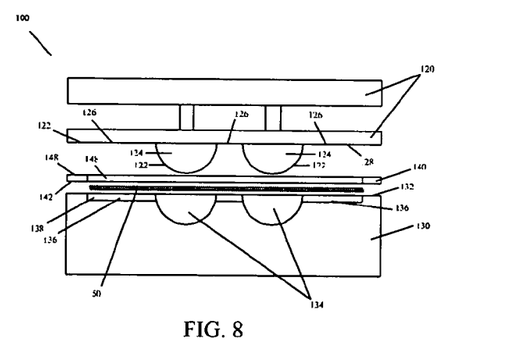
FIG. 8 is a side sectional view of the apparatus of FIG. 7, reflecting a forming step in accordance with an illustrative embodiment of the present invention.
Figure 9:
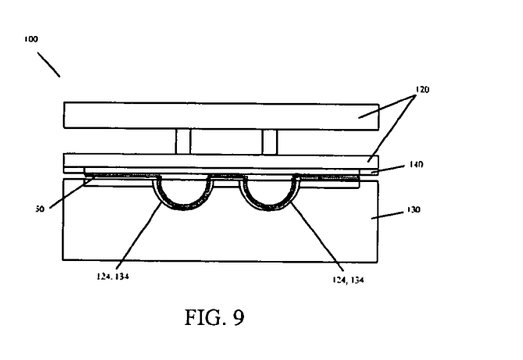
FIG. 9 is a side sectional view of the apparatus of FIG. 7, reflecting another forming step in accordance with an illustrative embodiment of the present invention.

Having described some of the preferred characteristics of another illustrative embodiment, the process or method for forming a garment 70 using apparatus 100, preferably includes at least the following steps. First, referring to FIG. 8, assembly of material 50 is positioned between first element 120 and second element 130 of apparatus 100. Referring to FIG. 9, first element 120 is then closed in relation to second element 130, or vice-versa, thereby sandwiching the assembly of material 50 therebetween. Then, first element 120 is opened in relation to second element 130, or vice-versa, after a period of about 20 seconds to about 80 seconds and more preferably about 50 seconds, to leave a laminated and molded assembly 60 like that shown in FIG. 10, and then, eliminating any excess material as appropriate, leaving a laminated and molded garment 70 like that shown in FIG. 11.

It is noted that third element 140, if used, may be engaged in relation to second element 130 either before, after or simultaneously with the step of closing first element 120 in relation to second element 130. Further, the step of disengaging third element 140 is preferably performed after the step of opening first element 120 in relation to second element 130.

It is also noted that various other steps and/or features well known in the art may also be incorporated into the present invention as appropriate for forming a desired garment type. Thus, for example, various alternative techniques for connecting fabrics/materials can used, various different cutting and/or finishing techniques can be used, or various material types may also be used as appropriate.

The present invention having been thus described with particular reference to the preferred forms thereof, it will be obvious that various changes and modifications may be made therein without departing from the spirit and scope of the present invention as defined herein.

What is claimed is:

1. A method for forming a molded brassiere, comprising:
    positioning a multi-layer assembly of garment materials, comprising an outer layer, and inner layer, and an intermediate support layer, between a first heated mold element and a second heated mold element, the first heated mold element having a pair of spaced openings formed through a substantially planar inner surface, the second heated mold elements having a pair of female cavities formed therein a substantially planar inner surface and corresponding to the openings formed through the first heated mold element;
    moving said first and second heated mold elements in relation to one another to laminate said assembly of material into a substantially planar laminated assembly between the inner surfaces and to cut excess material from the laminated assembly to define a laminated brassiere assembly having a pair of spaced apart and interconnected breast cup areas, an integrally formed torso band portion extending outwardly from each breast cup area, and finished edges, without any additional sewing steps; and
    moving a third heated mold element having a pair of male molds through the pair of spaced openings in said first heated mold element into contact with said laminated assembly and into the pair of female cavities of the second heated mold element so that said third heated mold element forms a pair of breast cups in the breast cup areas of the laminated brassiere assembly, wherein the third heated mold element is engaged to move through the pair of spaced openings of the first heated mold element simultaneously to moving the first and second heated mold elements in relation to one another.

2. The method of claim 1, further comprising moving said first, second, and third heated mold elements to allow the laminated brassiere assembly to be removed therefrom.

3. The method of claim 1, further comprising removing said third heated mold element from contact with said laminated assembly before moving said first and second heated mold elements to allow the laminated brassiere assembly to be removed therefrom.

4. The method of claim 1, wherein said third heated mold element is removed after a period of about 35 seconds and said first and second heated mold elements are moved after a period of about 15 seconds after removing said third heated mold element.

5. The method of claim 1, wherein moving said first and second heated mold elements in relation to one another causes said first and second heated mold elements to mold a pattern in said laminated assembly.

6. A method for forming a molded brassiere, comprising:
    positioning a multi-layer assembly of garment materials, comprising an outer layer, and inner layer, and an intermediate support layer, between a first heated mold element and a second heated mold element, the first heated mold element having a pair of male molds projecting from a substantially planar inner surface, the second heated element having a pair of female cavities formed therein a substantially planar inner surface;
    holding said assembly of material in a desired location on said second heated mold element; and
    moving said first and second heated mold elements in relation to one another to laminate said assembly of material between said substantially planar inner surfaces into a laminated assembly while said first heated mold element forms a pair of breast cups in the laminated assembly and to cut excess material from the laminated assembly to define a laminated brassiere assembly having a pair of spaced apart and interconnected breast cup areas, an integrally formed torso band portion extending outwardly from each breast cup, and finished edges, without any additional sewing steps, wherein the first and second heated mold elements are engaged to move and laminate, cut and mold the brassiere simultaneously.

7. The method of claim 6, further comprising moving said first and second heated mold elements to allow the laminated brassiere assembly to be removed therefrom after a period of between about 20 seconds and 80 seconds.

8. The method of claim 7, wherein said period is about 50 seconds.

* * * * *